(12) United States Patent
Takai et al.

(10) Patent No.: US 8,206,617 B2
(45) Date of Patent: Jun. 26, 2012

(54) IRIDIUM-CONTAINING PHOSPHOR AND METHOD FOR PRODUCING THE SAME

(75) Inventors: Jun Takai, Kurashiki (JP); Yoshihisa Tsuji, Kurashiki (JP); Hideharu Iwasaki, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/530,796

(22) PCT Filed: Apr. 8, 2008

(86) PCT No.: PCT/JP2008/056912
§ 371 (c)(1),
(2), (4) Date: Sep. 11, 2009

(87) PCT Pub. No.: WO2008/126833
PCT Pub. Date: Oct. 23, 2008

(65) Prior Publication Data
US 2010/0032628 A1   Feb. 11, 2010

(30) Foreign Application Priority Data

Apr. 9, 2007  (JP) ................................. 2007-101326
Jul. 2, 2007   (JP) ................................. 2007-173885

(51) Int. Cl.
*H01B 1/06*    (2006.01)
*H01B 1/10*    (2006.01)
*H01B 1/02*    (2006.01)
*C09K 11/54*   (2006.01)
*C09K 11/56*   (2006.01)

(52) U.S. Cl. .......... 252/519.4; 252/519.51; 252/301.6 S

(58) Field of Classification Search .................. 252/500, 252/519.4, 519.51, 301.6 S
See application file for complete search history.

(56) References Cited

U.S. PATENT DOCUMENTS

| | | | | |
|---|---|---|---|---|
| 7,422,801 B2 * | 9/2008 | Yamashita | ..................... | 428/690 |
| 2004/0262577 A1 * | 12/2004 | Urabe et al. | ............ | 252/301.6 S |
| 2006/0073428 A1 * | 4/2006 | Ohzeki | ......................... | 430/619 |
| 2007/0205410 A1 * | 9/2007 | Ikeda et al. | ...................... | 257/40 |
| 2009/0051282 A1 * | 2/2009 | Ueda et al. | .................... | 313/506 |
| 2009/0166587 A1 * | 7/2009 | Tsuji et al. | .............. | 252/301.6 S |

FOREIGN PATENT DOCUMENTS

| | | |
|---|---|---|
| EP | 2 048 216 A1 | 4/2009 |
| JP | 2003-73119 | 3/2003 |
| JP | 2005 36214 | 2/2005 |
| JP | 2006 143947 | 6/2006 |
| JP | 2007 224174 | 9/2007 |
| WO | 2007 043676 | 4/2007 |
| WO | 2008 013243 | 1/2008 |

OTHER PUBLICATIONS

Bol, A. A. et al., "Luminescence of Nanocrystalline ZnS:$Cu^{2+}$", Journal of Luminescence, vol. 99, pp. 325-334 (2002).

Adachi, D. et al., "Blue Emitting Thin-Film Electroluminescent Devices Utilizing Tm-Doped ZnS Nanocystals", Journal of Non-Crystalline Solids, vol. 325, pp. 1628-1631 (2006).

Lee, J. W. et al., "Photoluminescence Characteristics of Mn- and Pr-Doped ZnS Nanoparticles Optically Annealed With UV Illumination", Japanese Journal of Applied Physics, vol. 44, No. 10, pp. 7694-7697 (2005).

* cited by examiner

*Primary Examiner* — Lorna M Douyon
*Assistant Examiner* — Tanisha Diggs
(74) *Attorney, Agent, or Firm* — Oblon, Spivak, McClelland, Maier & Neustadt, L.L.P.

(57) ABSTRACT

An iridium-containing group II-VI compound phosphor capable of efficiently emitting light without any economical problems or problems in energy efficiency or color purity is provided. A method for producing the phosphor is also provided. The phosphor comprises iridium and a group II-VI compound semiconductor, and the iridium is uniformly dispersed in surfaces of phosphor particles and in an inside of the phosphor particles. The method for producing the iridium-containing phosphor comprises firing an inorganic composition containing a group II-VI compound semiconductor and an iridium compound, and an iridium complex salt is used as the iridium compound.

18 Claims, 5 Drawing Sheets

IRIDIUM-CONTAINING PHOSPHOR AND METHOD FOR PRODUCING THE SAME

This is an application filed under 35 U.S.C. 371 of PCT/JP2008/056912, filed Apr. 8, 2008, which claims priority from Japan 2007-101326, filed Apr. 9, 2007 and Japan 2007-173885, filed Jul. 2, 2007.

TECHNICAL FIELD

The present invention relates to iridium-containing phosphors and methods for producing the iridium-containing phosphors. In particular, the present invention relates to a phosphor containing a group II-VI compound semiconductor (hereinafter, this may be referred to as "II-VI compound semiconductor") as a host material and iridium uniformly dispersed in a surface of phosphor particles and in an inside of the phosphor particles. The present invention also relates to methods for producing the phosphor.

BACKGROUND ART

Inorganic compositions containing a compound semiconductor as a main constituent material are used in the fields of materials of luminescence such as fluorescence and phosphorescence, long afterglow phosphorescent materials, and the like. Some of the inorganic compositions have a characteristic that they produce light by electric energy, and are used as light sources in displays and the like. However, since materials that are currently known are not capable of sufficiently converting electric energy into light and produce a color of low purity, there are problems in heat generation, power consumption, and the like. Therefore, use of the inorganic compositions in light sources and displays is difficult, or is economically unsuitable because it requires a large amount of rare-earth salts, which are expensive.

Among the inorganic compositions containing a compound semiconductor as a main constituent material, those containing iridium are known as a raw material for preparing luminescent materials that are capable of producing light efficiently (Patent Document 2). Since Patent Document 2 does not disclose an amount of iridium contained in the iridium-containing II-VI compound semiconductor disclosed in Patent Document 2, a specific iridium content is not clear, but Patent Document 2 is at least silent on dispersibility.

Especially blue phosphors are useful not only as a luminescent material for a monochromatic light but also as a luminescent material for white color.

Among phosphors containing a II-VI compound semiconductor as a main constituent material, those doped with copper (refer to, for example, Non-patent Document 1) and those doped with thulium (Tm) (refer to, for example, Non-patent Document 2) are known as blue phosphors. Phosphors containing as a main constituent material a II-VI compound semiconductor prepared under hydrothermal conditions (refer to, for example, Patent Document 1) and phosphors containing a II-VI compound semiconductor as a main constituent material and using praseodymium as a dopant (refer to Non-patent Document 3) are also known.

Further, there are luminous bodies using iridium (Patent Document 2).

Patent Document 1: JP 2005-36214 A
Patent Document 2: JP 2006-143947 A
Non-patent Document 1: Journal of Luminescence 99 (2002) 325-334
Non-patent Document 2: Journal Non-Crystalline Solids 352 (2006) 1628-1632
Non-patent Document 3: Japanese Journal of Applied Physics Vol. 44, No. 10, 2005, p 7694-7697

DISCLOSURE OF THE INVENTION

Problems to be Solved by the Invention

As described above, the known fluorescent materials are applicable to limited uses only; therefore, there have been demands for a solution to the economical problems and problems in energy efficiency and color purity, and the like.

Especially the known blue fluorescent materials have the problems that they are difficult to use in light sources or displays because energy efficiency and color purity are low, and that they are economically unsuitable because a large amount of rare-earth salts, which are expensive, is required; thus, there have been demands for a solution to the problems. Further, experiments to check Patent Document 2 were performed using iridium compounds, and deposition of iridium metals in phosphors was observed in some cases; it was found that luminescence performance of the phosphors was not always stable.

An object of the present invention is to provide iridium-containing phosphors capable of efficiently producing light, and methods for producing the iridium-containing phosphors.

Means for Solving the Problems

The present inventors studied phosphors containing II-VI compound semiconductors as a host material and iridium. Consequently, they found: the element iridium did not adequately contribute to improvement in phosphor efficiency if the element iridium was localized in a surface of II-VI compound semiconductor particles or if an amount of iridium between particles was not uniform; in cases in which a II-VI compound semiconductor was used as a host material, the element iridium exhibited specific behaviors when it was doped, compared with other elements; and when the element iridium was doped into a II-VI compound semiconductor, a phosphor was likely to be formed without formation of any precursor. The present inventors found from the foregoing that a phosphor that suited the above object could be obtained by making iridium between particles and iridium in the phosphor uniform in amount. By this finding, the present invention was completed.

Specifically, the present invention is a phosphor containing a II-VI compound semiconductor as a host material and iridium, wherein the iridium is uniformly dispersed in a surface of the phosphor and in an inside of the phosphor.

The present inventors also found that the above object can be achieved by use of an iridium complex salt for the II-VI compound semiconductor. Specifically, the present invention provides:

[1] a method for producing an iridium-containing phosphor comprising firing an inorganic composition containing a II-VI compound semiconductor and an iridium compound, wherein an iridium complex salt is used as the iridium compound;

[2] the method for producing an iridium-containing phosphor comprising firing an inorganic composition containing a II-VI compound semiconductor and an iridium compound, wherein the inorganic composition is obtained by mixing in an aqueous medium a group II metal salt, a group VI compound, and an iridium complex salt;

[3] the method of [2], wherein: the inorganic composition is obtained by mixing an aqueous solution containing a group II metal salt with an aqueous solution containing a group VI compound; and the iridium complex salt is present in at least one of the aqueous solution containing the group II metal salt and the aqueous solution containing the group VI compound; and

[4] the method of [1], wherein the iridium complex salt is a hexachloroiridium salt.

Advantages of the Invention

The phosphor of the present invention is excellent in conversion efficiency because it comprises iridium uniformly dispersed in a surface of the phosphor and in an inside of the phosphor. The phosphor of the present invention is suitable for use in light sources, displays, and the like.

BEST MODE FOR CARRYING OUT THE INVENTION

Figure 1:
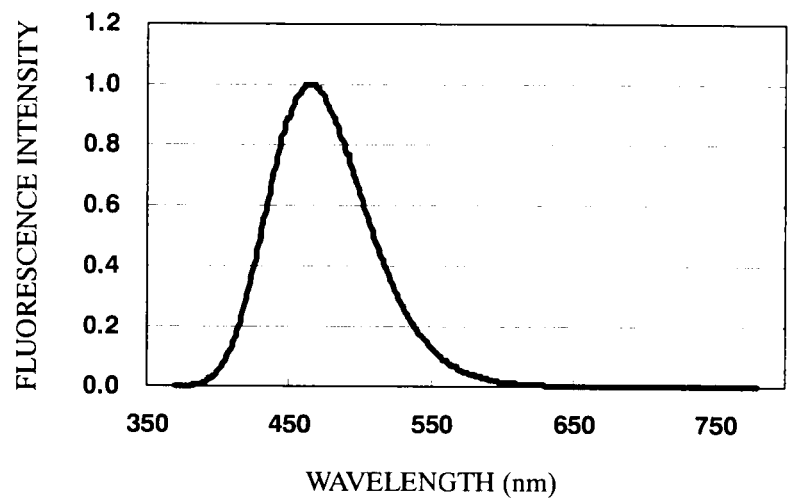
FIG. 1 shows a result of measurement of a fluorescence spectrum of a phosphor of Example 1.

A II-VI compound semiconductor for use as a host material of a phosphor of the present invention is not particularly limited, as long as it is a II-VI compound semiconductor containing a compound of an element of group II and an element of group VI. Examples of II-VI compound semiconductors that can be used include zinc sulfide, cadmium sulfide, zinc selenide, and cadmium selenide. They may be used singly or in combination. Further, a crystal structure of the II-VI compound semiconductor is not particularly limited; the II-VI compound semiconductor may have a hexagonal or cubic crystal structure, or may be a polymorphic crystal mixture, which is a hybrid of hexagonal and cubic crystal forms.

A method comprising mixing the II-VI compound semiconductor, an iridium compound, and, when necessary, sulfur and heating and firing the mixture is commonly used to dope iridium into the II-VI compound semiconductor. However, when the firing is carried out using a firing furnace having a heat insulator to increase energy efficiency, it takes a while to cool off, and uniformity is likely to be lost during the cooling. In other words, if the high temperature is kept for a long period of time after the doping, the iridium diffused in phosphor particles bleeds into a surface of the phosphor particles, causing the iridium in the phosphor particles to become non-uniform.

Accordingly, it is preferable that the phosphor of the present invention be produced by a method comprising mixing a II-VI compound semiconductor, an iridium compound, and, when necessary, sulfur, and applying a shock wave of at least 0.1 GPa to dope iridium.

In the cases of using a shock wave in the production of the phosphor of the present invention, it is preferable to add sulfur to supplement sulfur that is lost due to heat produced by a shock. An amount of sulfur to be added is not particularly limited; it is generally preferable to add 0.1-300 parts by weight, preferably 1-200 parts by weight, of sulfur with respect to 100 parts by weight of the II-VI compound semiconductor.

In the cases of using a shock wave, a material is heated to a reaction temperature by heat generated by shock pressure. Although a rate of cooling to a normal temperature cannot be uniformly determined according to a size of a reactor or a level of acceleration to be employed, it is generally preferable to cool off within 5 minutes, preferably within 1 minute, from the application of a shock.

The iridium compound is not particularly limited. Examples of iridium compounds that can be used include halide salts, such as iridium chloride, iridium bromide, and iridium iodide, iridium-containing mineral acid salts, such as iridium sulfate and iridium nitrate, organic acid salts, such as iridium acetate, iridium butyrate, and iridium benzoate, and complexes, such as iridium acetylacetonate.

An amount of iridium to be doped is not limited, but it is preferable to dope 5-10000 ppm, preferably 10-8000 ppm, of iridium with respect to the resulting phosphor, because doping an excess amount of iridium is uneconomical and sometimes causes concentration quenching, and doping an insufficient amount of iridium does not form a luminescent center that is adequate enough to obtain high fluorescence efficiency.

Use of a flux at the time of application of a shock in the production of the phosphor of the present invention is preferred, because it enables smooth incorporation of iridium and other metals. Examples of fluxes that can be used include ammonium chloride, sodium chloride, potassium chloride, barium chloride, magnesium chloride, and zinc chloride. They may be used singly or in combination. An amount of the flux to be used is not particularly limited, but, in view of an amount of residue in the phosphor and phosphor particle size growth control, it is preferable to add 0.1-10 parts by weight, preferably 0.5-5 parts by weight, of the flux with respect to 100 parts by weight of the II-VI compound semiconductor.

In the production of the phosphor of the present invention, copper, manganese, silver, a rare-earth element, a mixture thereof, or the like may be doped singly or in combination.

The phosphor of the present invention contains iridium uniformly dispersed in the phosphor, but it is preferable that a ratio of an amount of iridium contained in the inside of the phosphor to an amount of iridium contained in the surface of the phosphor vary within plus or minus 5%. Specifically, it is preferable that the following formula be satisfied $-0.05 \leq$ [(amount of Ir contained in the inside of a phosphor−amount of Ir contained in the surface of the phosphor)/(amount of Ir contained in the surface of the phosphor)]$\leq 0.05$.

In the present invention, a product obtained as a result of the application of a shock is rinsed. Iridium salts and other metal salts that are not doped and excess fluxes that were added are removed by the rinsing. Neutral or acidic water can be used in the rinsing. The acidic component is not particularly limited, and examples of acidic components that can be used include mineral acids, such as hydrochloric acid, sulfuric acid, nitric acid, and phosphoric acid, and organic acids, such as acetic acid, propionic acid, and butyric acid. They may be used singly or in combination.

In cases of using the acidic water, it is generally preferable to use 0.1-20% by weight, preferably 1-10% by weight, of an aqueous solution, because the II-VI compound semiconductor may decompose when contacting with a high-concentration acidic substance. In view of decomposition of the II-VI compound semiconductor and residual ions in the surface, use of acetic acid is preferred. The rinsed II-VI compound semiconductor is dried by a method using vacuum, hot air, or the like to obtain a desired phosphor.

Whether iridium is doped into the II-VI compound semiconductor can be confirmed by measuring a quantum efficiency. The quantum efficiency is a ratio of a number of photons released by excitation caused by incident light to a number of photons of the incident light that are absorbed into a substance. A greater quantum efficiency indicates a higher doping effect. The quantum efficiency can be measured by a spectrofluorometer.

An especially preferred method for producing the phosphor according to the present invention is a method for producing an iridium-containing phosphor comprising firing an inorganic composition containing a II-VI compound semiconductor and an iridium compound, wherein an iridium complex salt is used as the iridium compound. This method is specifically described below.

As described above, the II-VI compound semiconductor for use as a basic material is not particularly limited.

Iridium complex salts are used as the iridium compound. In cases of using an iridium salt that is commonly available, such as iridium halide salts such as iridium chloride, since such an iridium salt is difficult to dissolve in a solvent such as water and alcohol, it is required to use a large amount of water. Furthermore, since the iridium salt aggregates easily, it is not possible to uniformly disperse the iridium salt into the II-VI compound semiconductor. Thus, it is difficult to incorporate the iridium salt into the II-VI compound semiconductor, because the iridium salt aggregates and is reduced when heated and fired. The iridium complex salts to be used are not particularly limited. A valence of iridium is not particularly limited, and trivalent iridium and tetravalent iridium can be used. Examples include ammonium hexachloroiridate(III), sodium hexachloroiridate(III), potassium hexachloroiridate(III), ammonium hexachloroiridate(IV), sodium hexachloroiridate(IV), potassium hexachloroiridate(IV), hydrogen hexachloroiridate(IV), ammonium hexabromoiridate(III), sodium hexabromoiridate(III), potassium hexabromoiridate(III), ammonium hexabromoiridate(IV), sodium hexabromoiridate(IV), potassium hexabromoiridate(IV), hydrogen hexabromoiridate(IV), ammonium hexaiodoiridate(III), sodium hexaiodoiridate(III), potassium hexaiodoiridate(III), ammonium hexaiodoiridate(IV), sodium hexaiodoiridate(IV), potassium hexaiodoiridate(IV), hydrogen hexaiodoiridate(IV), hexaammineiridium(III) chloride, potassium hexacyanoiridate(III), and pentaamminechloroiridium(III) chloride. Use of the foregoing ammonium salts is preferred in view of availability, safety, and prevention of residual metal impurities in the resulting iridium sulfide. Specifically, it is preferable to use a hexachloroiridium salt, such as ammonium hexachloroiridate(III) and ammonium hexachloroiridate(IV).

A method of incorporating the foregoing iridium is not particularly limited. Examples of methods that are commonly used include: a method comprising mixing a solid of iridium complex salt with a solid of the II-VI compound semiconductor and heating and firing the mixture; a method comprising dispersing the II-VI compound semiconductor into water, adding powder of the iridium complex salt or the iridium complex salt dissolved in an aqueous solution, evaporating water with stirring to obtain an inorganic composition, and heating and firing the inorganic composition; and a method comprising producing the II-VI compound semiconductor in the presence of the iridium complex salt and heating and firing the resulting composition. To prevent aggregation of the iridium complex salt and to fix the iridium complex to the II-VI compound semiconductor, it is preferable to employ a method comprising fixing the iridium complex salt in a molten state.

A method of producing the II-VI compound semiconductor is not particularly limited, and the II-VI compound semiconductor can be produced by mixing in an aqueous medium a group II metal salt, a group VI compound, and an iridium complex salt. Examples include a method comprising mixing an aqueous solution containing a group II metal salt with an aqueous solution containing a group VI compound, wherein an iridium complex salt is present in at least one of the aqueous solution containing the group II metal salt and the aqueous solution containing the group VI compound. Examples of aqueous media include water and aqueous media maintaining solubility and containing up to 50% by weight, in concentration in water, of an organic compound, such as alcohols such as methanol, ethanol, and ethylene glycol, ketones such as acetone, ethers such as dioxane and tetrahydrofuran, dimethyl sulfoxides, sulfolanes, and amides such as dimethylformamide. If the group II metal salt, the group VI compound, and the iridium complex salt are to be mixed in the aqueous medium, the iridium complex salt may be present in at least one of the aqueous solution containing the group II metal salt and the aqueous solution containing the group VI compound. In cases of using an inorganic compound, such as metal sulfide, as the group VI compound, it is preferable that the iridium complex salt is present in the aqueous solution containing the group II metal salt. In cases of using an organic compound, such as thiocarbonyl compounds, as the group VI compound, it is preferable that the iridium complex salt may be present in the aqueous solution of the group VI compound.

Since unreacted group II metal residue limits the uses, 0.5- to 5-fold by mole, generally 1.0- to 4-fold by mole, preferably 1.1- to 2-fold by mole, of the group VI compound is used with respect to the amount of the group II element. The production of the II-VI compound semiconductor can be carried out at a temperature of 0° C.-200° C., but, in view of safety and operability, it is preferable to produce the II-VI compound semiconductor at 0° C.-120° C., more preferably 10° C.-90° C. so that no special reactor is required. Examples of group II metal salts include salts of calcium, magnesium, barium, strontium, zinc, and cadmium. In view of a reaction rate and stability after reaction, use of zinc or cadmium is preferred. The salts to be used are not particularly limited. Examples of salts that can be used include mineral acid salts, such as hydrochloric acid salts, nitric acid salts, and sulfuric acid salts, organic acid salts, such as acetic acid salts and oxalic acid salts, and organic metal complexes, such as acetylacetonate. In view of availability, solubility in water, and stability, it is preferable to use a hydrochloric acid salt, nitric acid salt, or acetic acid salt. In view of stability of reaction and stability of the group VI compound, alkali metal sulfides, such as sodium sulfide and potassium sulfide, thioacetamide, and thiourea can be used as the group VI compound. They may be used singly or in combination.

An amount of water to be used to fix the iridium complex salt to the II-VI compound semiconductor is not particularly limited, but, in view of dispersibility, it is preferable that the II-VI compound semiconductor has a slurry concentration of 0.1-50% by weight, preferably 1-30% by weight, during the fixing.

A method of removing water from the slurry is not particularly limited, but it is not preferable to use a method such as decantation, because it causes the iridium complex salt dissolved in the solution to be lost. A method comprising removing water from a slurry by reducing a pressure or heating is commonly used.

Although an amount of iridium to be incorporated into the II-VI compound semiconductor is not particularly limited, incorporation of an excess amount of iridium is not preferred because it is uneconomical and causes concentration quenching. Furthermore, a concentration that is too low is not preferred because a luminescent center is not adequate enough to obtain high fluorescence efficiency. Accordingly, it is generally preferable to incorporate 5-5000 ppm, preferably 10-1000 ppm, of iridium into the II-VI compound semiconductor.

The firing of the iridium-containing inorganic composition is carried out at a temperature in the range of from a temperature at which a crystal form of the II-VI compound semiconductor starts changing to a sublimation temperature. Specifically, the firing is carried out at a temperature of 500° C. to 1250° C., preferably 550° C. to 1000° C., more preferably 600° C. to 800° C.

A rate of increasing the temperature to a firing temperature is not particularly limited, but the rate is generally within the range of 2.0° C./min. to 40.0° C./min. A rate that is too fast is not preferred, because a furnace body and a vessel containing the II-VI compound semiconductor may be damaged. Further, a rate that is too slow is not preferred, because production efficiency decreases significantly. In view of the foregoing, it is preferable to increase the temperature at a rate of 2.5° C./min. to 30.0° C./min.

An atmosphere in which the firing is carried out is not particularly limited; the firing may be carried out in an atmosphere of any gas, including air, inert gas, and reducing gas.

A flux may be used in the firing to promote crystallization or to increase a particle size. Examples of fluxes that can be used include, as described above, alkali metal salts, such as sodium chloride and potassium chloride, alkaline earth salts, such as magnesium chloride, calcium chloride, and barium chloride, ammonium chloride, and zinc chloride. The foregoing fluxes may be used singly or in combination. An amount of the flux to be used is not particularly limited, but it is preferable to use 0.1-50% by weight, or, in view of operability and economic efficiency, 0.5-10% by weight of the flux with respect to the II-VI compound semiconductor.

As described above, other metals may be doped concurrently. A method of concurrently doping other metals is not particularly limited; other metals can be doped by a method comprising dissolving the other metals into water concurrently with dissolving the iridium complex salt, mixing the solution, and firing the mixture, or by a method comprising mixing the iridium complex salt, solid mixing a salt, and then firing the mixture. Examples of elements that can be doped include transition metals, such as silver, copper, and manganese, rare-earth elements, such as cerium and europium, and metal elements such as gallium. They may be mixed as a halide, such as chloride and bromide, a salt of an mineral acid, such as sulfuric acid, phosphoric acid, and nitric acid, or a salt of an organic acid, such as acetic acid and propionic acid. They may be used singly or in combination.

An amount of other elements to be incorporated into the II-VI compound semiconductor is not particularly limited, but incorporation of an excess amount of other elements is not preferred because it is uneconomical and causes concentration quenching, and incorporation of an insufficient amount of other elements is not preferred because a luminescent center is not adequate enough to obtain high fluorescence efficiency. Accordingly, it is generally preferable to incorporate 5-5000 ppm, preferably 10-1000 ppm, of other metals with respect to the II-VI compound semiconductor.

As described above, a simple substance of the group VI element may be added to supplement the group VI element that is lost at the time of firing. For example, sulfur may be added to supplement a sulfur component.

In the present invention, a product obtained as a result of the firing is rinsed. Iridium salts and other metal salts that are not incorporated and excess fluxes that were added are removed by the rinsing. Neutral or acidic water can be used in the rinsing. The acidic component is not particularly limited, and examples of acidic components that can be used include mineral acids, such as hydrochloric acid, sulfuric acid, nitric acid, and phosphoric acid, and organic acids, such as acetic acid, propionic acid, and butyric acid. They may be used singly or in combination. In cases of using acidic water, it is generally preferable to use 0.1-20% by weight, preferably 1-10% by weight, of an aqueous solution, because the II-VI compound semiconductor may decompose when contacting with a high-concentration acidic substance. In view of decomposition of the II-VI compound semiconductor and residual ions in the surface, it is preferable to use acetic acid.

In the present invention, the II-VI compound semiconductor that is fired and rinsed is then dried by a method using vacuum, hot air, or the like to obtain a desired phosphor.

EXAMPLES

The present invention is further illustrated by the following examples, but is not limited to the examples.

Example 1

Fifty grams of zinc sulfide (RAK-LC) of Sakai Chemical Industry Co., Ltd., 0.25 g of iridium trichloride, 0.5 g of sulfur, 0.22 g of copper(II) sulfate pentahydrate, 3.21 g of magnesium chloride hexahydrate, and 1.00 g of sodium chloride were mixed and stirred in a ball mill for 1 hour. One gram of the resulting mixture was removed and formed, at a pressure of 1 kg/cm$^2$, into a tablet having a diameter of 20 mm and a thickness of 1 mm by a hydraulic molding apparatus (RIKEN POWER P-1B-041) of Riken Seiki Co., Ltd.

The tablet was inserted into a target iron capsule, and the capsule was placed in a shock wave generator TYPE 20 of GM Engineering, Inc. An ABS missile that had a total length of 30 mm and a total weight of 22 g and was equipped with an iron collision surface having a thickness of 2 mm and a diameter of 40 mm was caused to collide with the target capsule in vacuum at a rate of 530 m/sec. A shock pressure at the time of the collision was 11 GPa. A momentum trap (of SUS 304) was provided to the target capsule, and heat that was generated was quickly released to cool off the target capsule. The target capsule was removed to obtain 1 g of a zinc sulfide mixture, which was a phosphor. The obtained product was rinsed with 500 ml of ion exchange water and dried to obtain 0.9 g of a dried phosphor.

Iridium in particles of the inside of phosphor was analyzed by ESCA. The phosphor particles to be etched by ESCA had a size of about 20 µm. The etching rate was 50 angstroms/sec. An amount of iridium contained in a surface of the particles (corresponding to a zero etching time), an amount of iridium contained in the particles at an etching time of 5 minutes (corresponding to an etching depth of 1.5 µm), and an amount of iridium contained in the particles at an etching time of 10 minutes (corresponding to an etching depth of 3 µm) were measured. The results of the ESCA analysis are shown in Table 1. A ratio of an amount of iridium contained in the inside of phosphor to an amount of iridium contained in the surface of the phosphor varied within plus or minus 5%. The result of measurement of a fluorescence spectrum by UV radiation is shown in FIG. 1, and a quantum efficiency is shown in Table 2.

Comparative Example 1

Ten grams of the mixture obtained in Example 1 was removed, charged into a crucible, and fired at 700° C. in a nitrogen atmosphere for 6 hours. The resulting mixture was cooled off for 8 hours to a room temperature, and then the mixture was rinsed with 1800 ml of ion exchange water and dried to obtain 9.2 g of a dried phosphor.

Figure 2:
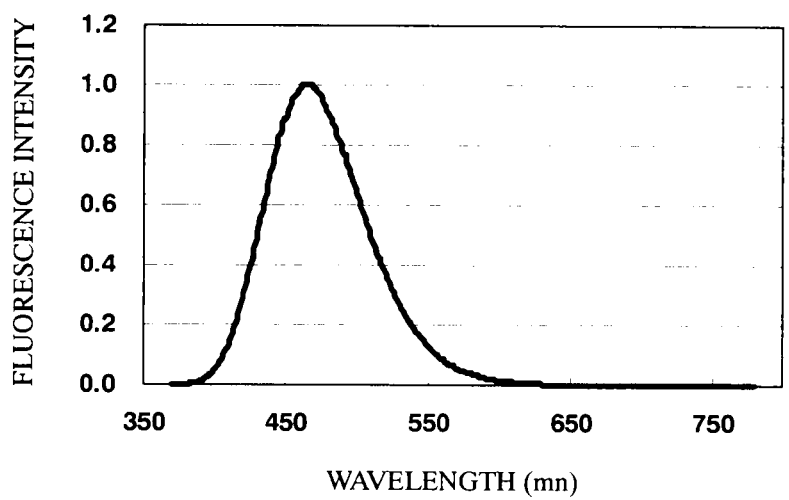
FIG. 2 shows a result of measurement of a fluorescence spectrum of a phosphor of Comparative Example 1.

Iridium in particles of the phosphor was analyzed by ESCA. The phosphor particles to be etched by ESCA had a size of about 20 µm. The etching rate was 50 angstroms/sec. An amount of iridium contained in a surface of the particles (corresponding to a zero etching time), an amount of iridium contained in the particles at an etching time of 5 minutes (corresponding to an etching depth of 1.5 µm), and an amount of iridium contained in the particles at an etching time of 10 minutes (corresponding to an etching depth of 3 µm) were measured. The results of ESCA analysis are shown in Table 1. The result of measurement of a fluorescence spectrum by UV radiation is shown in FIG. 2, and a quantum efficiency is shown in Table 2.

Comparative Example 2

Figure 3:
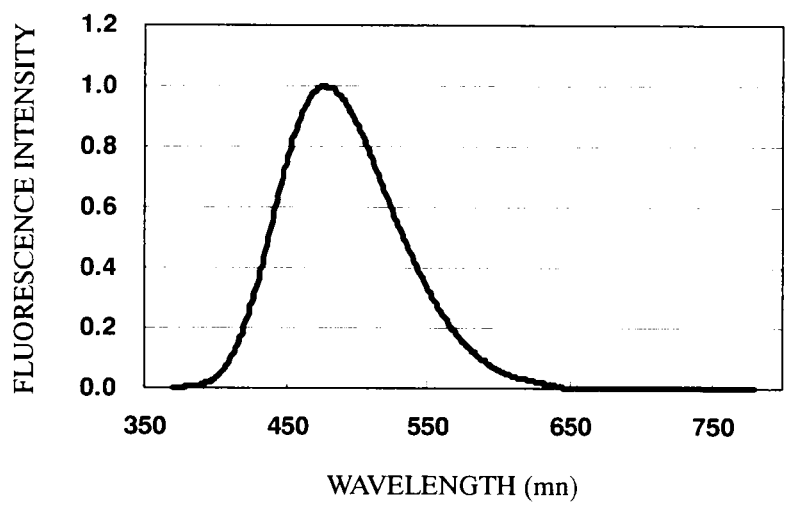
FIG. 3 shows a result of measurement of a fluorescence spectrum of a phosphor of Comparative Example 2.

The procedure of Example 1 was repeated, except that iridium trichloride was not mixed, to obtain 9.0 g of a dried phosphor. The result of measurement of a fluorescence spectrum by UV radiation is shown in FIG. 3, and a quantum efficiency is shown in Table 2.

Example 2

The procedure of Example 1 was repeated, except that the amount of iridium trichloride was changed from 0.25 g to 0.6 g, to obtain a phosphor, and ESCA analysis was performed.

Figure 4:
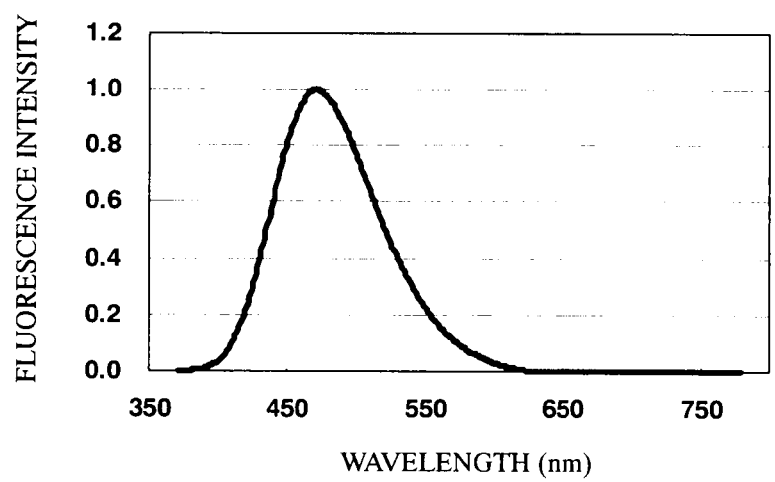
FIG. 4 shows a result of measurement of a fluorescence spectrum of a phosphor of Example 2.

The phosphor particles to be etched by ESCA had a size of about 20 µm. The etching rate was 50 angstroms/sec. An amount of iridium contained in a surface of the particles (corresponding to a zero etching time), an amount of iridium contained in the particles at an etching time of 5 minutes (corresponding to an etching depth of 1.5 µm), and an amount of iridium contained in the particles at an etching time of 10 minutes (corresponding to an etching depth of 3 µm) were measured. The results are shown in Table 1. The result of measurement of a fluorescence spectrum by UV radiation is shown in FIG. 4, and a quantum efficiency is shown in Table 2.

TABLE 1

|  | ETCHING (0 MIN) | ETCHING (5 MIN) | ETCHING (10 MIN) |
|---|---|---|---|
| EXAMPLE 1 | 2851 | 2837 | 2816 |
| EXAMPLE 2 | 4456 | 4512 | 4396 |
| COMPARATIVE EXAMPLE 1 | 2112 | 1456 | 952 |

TABLE 2

| EXAMPLES | QUANTUM EFFICIENCY |
|---|---|
| EXAMPLE 1 | 31.9 |
| EXAMPLE 2 | 33.6 |
| COMPARATIVE EXAMPLE 1 | 26.3 |
| COMPARATIVE EXAMPLE 2 | 21.5 |

Measurement by a spectrofluorometer was performed under the following conditions:
Measurement apparatus: FP-6500 of JASCO Corporation;
Excitation wave length: 350 nm;
Excitation band width: 5 nm; and
Softwater: Spectra Manager for Windows 95/NT Ver 1.00.00 2005 of JASCO Corporation.

Example 3

In a 200-ml recovery flask, 20 g of zinc sulfide was dispersed into 100 g of ion exchange water, and then 0.023 g of ammonium hexachloroiridate(IV) (500 ppm of zinc sulfide as Ir) was dissolved. After 1 hour of stirring, the recovery flask was loaded into a rotary evaporator, and water was removed at a reduced pressure of 2000 Pa at 80° C. Then, the pressure was further reduced to 130 Pa, and drying was continued for 1 hour. The resulting solid, 3.0 g of sodium chloride, 3.0 g of potassium chloride, and 6 g of sulfur were stir mixed in a mortar, and the mixture was charged into a crucible having a volume of 60 ml. After nitrogen substitution of a firing furnace, the crucible was placed into the furnace, followed by nitrogen substitution. The temperature in the firing furnace was increased by 200° C. per hour until it reached 700° C. After the temperature in the furnace reached the predetermined temperature, the temperature was maintained for 6 hours, and thereafter cooled off for 8 hours to a room temperature. The resulting mixture was rinsed with 100 g of an aqueous solution of 5% acetic acid, rinsed three times with 200 g of ion exchange water, and then vacuum dried at 120° C. to obtain 18.84 g of a dried product.

Figure 5:
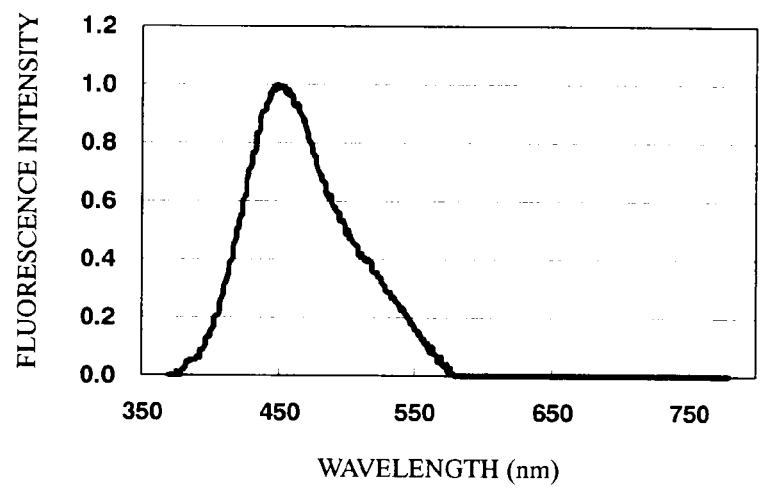
FIG. 5 shows a result of measurement of a fluorescence spectrum of a phosphor of Example 3.

A fluorescence spectrum was measured by UV radiation as in Example 1. The result is shown in FIG. 5. Further, ESCA analysis was carried out as in Example 1. The results are shown in Table 4.

A phosphor using only iridium also exhibits fluorescence, but as is apparent from the results of other Examples, phosphors doped with a luminescent center such as manganese are significantly excellent.

Samples for ICP optical emission analysis were prepared by two different methods, and ICP analysis was performed on the above dried product.

Method 1

One hundred milligrams of a sample was charged into a platinum crucible, and sulfuric acid and potassium bisulfate were added and melted. The resulting mixture was diluted to 1 L with 2M sulfuric acid to prepare a sample.

Method 2

One hundred milligrams of a sample was dissolved in 2N hydrochloric acid, and the mixture was filtered by a membrane filter to remove substances that did not dissolve, and diluted to 1 L with ion exchange water to prepare a sample.

The results of Ir analysis by the respective methods are shown in Table 3.

Comparative Example 3

The procedure of Example 3 was repeated, except that 0.017 g of tetrachloroiridium was used in place of 0.023 g of ammonium hexachloroiridate(IV).

Samples for ICP optical emission analysis were prepared by two different methods as in Example 3, and ICP analysis was performed. The results are shown in Table 3.

ESCA analysis was performed as in Example 1. The results are shown in Table 4.

Example 4

In 2 L of ion exchange water, 297.6 g of zinc nitrate and 3 g of manganese nitrate were dissolved to prepare solution A. Further, in 2 L of ion exchange water, 0.032 g of ammonium hexachloroiridate(IV) and 288.6 g of sodium sulfide were dissolved to prepare solution B. The solution B was left for 1 hour after the preparation and then used. Each of the solutions A and B was fed by a metering pump at a rate of 5 mL per second, stirred by a static mixer (T4-15 R-4PT of Noritake Co., Limited), and then fed into a tube made of vinyl chloride. The solutions A and B were kept in the tube for 3 minutes and then fed into a centrifuge continuously. The resulting solid was removed.

Twenty grams of the resulting solid, 3.0 g of sodium chloride, 3.0 g of potassium chloride, and 6 g of sulfur were stir mixed in a mortar, and the mixture was charged into a crucible having a volume of 60 mL. After nitrogen substitution of a firing furnace, the crucible was placed into the furnace, followed by nitrogen substitution. The temperature in the firing furnace was increased by 200° C. per hour until it reached 700° C. After the temperature in the furnace reached the predetermined temperature, the temperature was maintained for 6 hours, and thereafter cooled off for 8 hours to a room temperature. The resulting mixture was rinsed with 100 g of an aqueous solution of 5% acetic acid, rinsed three times with 200 g of ion exchange water, and then vacuum dried at 120° C. to obtain 19.10 g of a dried product.

Samples for ICP optical emission analysis were prepared by two different methods as in Example 3, and ICP analysis was performed. The results are shown in Table 3.

Figure 6:
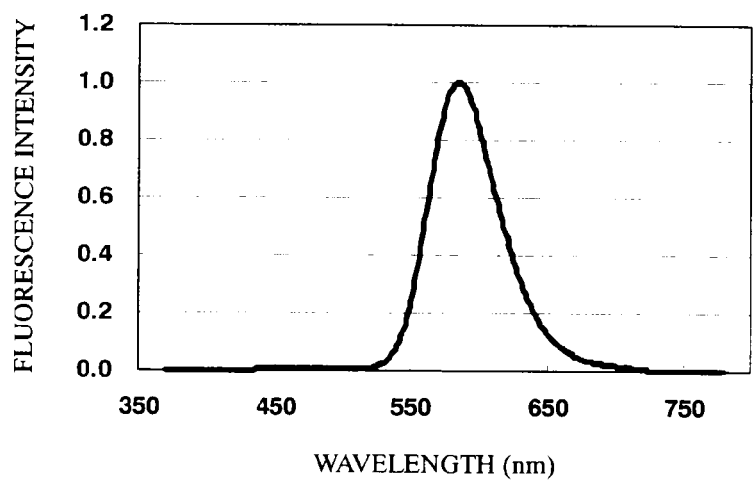
FIG. 6 shows a result of measurement of a fluorescence spectrum of a phosphor of Example 4.

A fluorescence spectrum was measured by UV radiation as in Example 1. The result is shown in FIG. 6. Further, ESCA analysis was carried out as in Example 1. The results are shown in Table 4, and a quantum efficiency is shown in Table 5.

Comparative Example 4

The procedure of Example 4 was repeated, except that 0.024 g of tetrachloroiridium was used in place of 0.032 g of ammonium hexachloroiridate(IV), to obtain 18.66 g of a dried product.

Samples for ICP optical emission analysis were prepared by two different methods as in Example 3, and ICP analysis was performed. The results are shown in Table 3.

Figure 7:
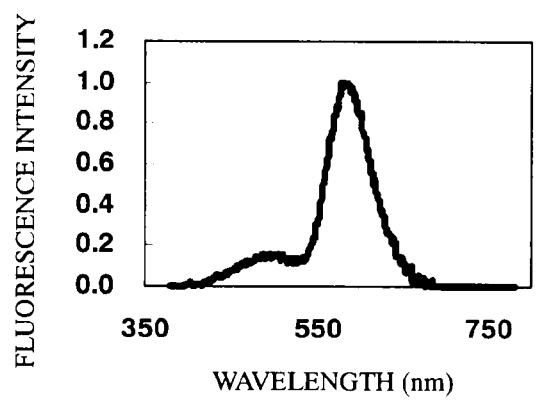
FIG. 7 shows a result of measurement of a fluorescence spectrum of a phosphor of Comparative Example 4.

A fluorescence spectrum was measured by UV radiation as in Example 1. The result is shown in FIG. 7. Further, ESCA analysis was carried out as in Example 1. The results are shown in Table 4. A quantum efficiency is shown in Table 5.

Example 5

The procedure of Example 3 was repeated, except that 0.023 g of ammonium hexachloroiridate(III) was used in place of 0.023 g of ammonium hexachloroiridate(IV), to obtain 18.32 g of a dried product.

Samples for ICP optical emission analysis were prepared by two different methods as in Example 3, and ICP analysis was performed. The results are shown in Table 3.

ESCA analysis was performed as in Example 1. The results are shown in Table 4.

Example 6

The procedure of Example 3 was repeated, except that 0.039 g of ammonium hexabromoiridate(IV) was used in place of 0.023 g of ammonium hexachloroiridate(IV), to obtain 18.51 g of a dried product.

Samples for ICP optical emission analysis were prepared by two different methods as in Example 3, and ICP analysis was performed. The results are shown in Table 3.

ESCA analysis was performed as in Example 1. The results are shown in Table 4.

Comparative Example 5

The procedure of Example 6 was repeated, except that 0.028 g of tetrabromoiridium(IV) was used in place of 0.039 g of ammonium hexabromoiridate(IV) was used, to obtain 18.87 g of a dried product.

Two samples for ICP optical emission analysis were prepared by two different methods as in Example 3, and ICP analysis was performed. The results are shown in Table 3.

ESCA analysis was performed as in Example 1. The results are shown in Table 4.

Example 7

In a 2-L three-necked flask having a stirrer, a reflux tube, and a thermometer, 223.2 g of zinc nitrate hexahydrate, 258 mg of copper(II) chloride, and 130.55 mg of ammonium hexachloroiridate(III) were charged, and then 750 mL of water and 1.5 g of nitric acid were added and dissolved. Then, 84.5 g of thioacetamide was added, and the mixture was heated to 85° C. and thereafter heated with stirring for 3 hours. Then, the mixture was cooled off to a room temperature. While an upper layer was removed by decantation, the mixture was rinsed with ion exchange water. When a pH of the rinsing solution reached 6, the rinsing was stopped, and zinc sulfide was obtained. The zinc sulfide was dried by hot air at 150° C. for 12 hours to obtain 60.7 g of a solid.

Twenty grams of the resulting solid, 3.0 g of sodium chloride, 3.0 g of potassium chloride, and 6 g of sulfur were stir mixed in a mortar, and the mixture was charged into a crucible having a volume of 60 mL. After nitrogen substitution of a firing furnace, the crucible was placed into the furnace, followed by nitrogen substitution. The temperature in the firing furnace was increased by 200° C. per hour until it reached 700° C. After the temperature in the furnace reached the predetermined temperature, the temperature was maintained for 6 hours, and thereafter cooled off for 8 hours to a room temperature. The resulting mixture was rinsed with 100 g of an aqueous solution of 5% acetic acid, rinsed three times with 200 g of ion exchange water, and then vacuum dried at 120° C. to obtain 19.30 g of a dried product.

Figure 8:
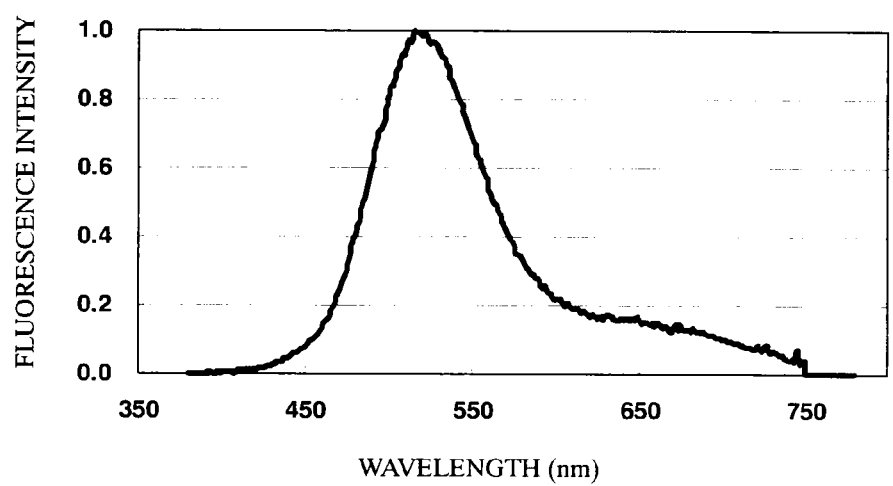
FIG. 8 shows a result of measurement of a fluorescence spectrum of a phosphor of Example 7.

A fluorescence spectrum was measured by UV radiation as in Example 1. The result is shown in FIG. 8. Further, ESCA analysis was carried out as in Example 1. The results are shown in Table 4, and a quantum efficiency is shown in Table 5.

Samples for ICP optical emission analysis were prepared by two different methods as in Example 3, and ICP analysis was performed. The results are shown in Table 3.

Since an iridium metal does not dissolve in hydrochloric acid, when ICP measurement is performed by a hydrochloric acid method (Method 2 described above), Ir that is not incorporated in the form of an ion in a phosphor is not detected. Comparing the concentrations of iridium in the phosphors obtained in Example 3 and Comparative Example 3, levels of iridium detected by ICP analysis performed by Methods 1 and 2 were almost the same in Example 3; the results show that no iridium metal was contained in the phosphors. On the other hand, the concentration of iridium of Method 2 was significantly lower than that of Method 1 in Comparative Example 3; the results show that the phosphors contained a large amount of iridium metals that did not contribute to luminescent characteristics.

The results of analysis performed in Examples 4-7 and Comparative Examples 4 and 5 were similar to those obtained in Example 3 and Comparative Example 3.

Example 8

In a 2-liter separable flask having a stirrer, a thermometer, and a reflux tube, 360.0 g of zinc nitrate hexahydrate, 7.20 g of magnesium sulfate, 57 ml of an aqueous solution of 0.1 M silver nitrate, 3.66 g of gallium nitrate, and 195.86 mg of ammonium hexachloroiridate were dissolved in 1200 g of ion exchange water. One gram of nitric acid was added, and a pH was adjusted to about 2. Then, the mixture was heated to 90° C. with stirring.

When the temperature of the mixture reached a predetermined temperature, 133.6 g of thioacetamide in the form of a solid was added. The mixture was stirred for two hours after the addition and then cooled to 30° C. to stop the reaction. During the cooling, nitrogen was passed to expel hydrogen sulfide in the system. The reaction solution was removed by decantation. The solid was rinsed with ion exchange water until a pH of the rinsing solution reached 5 or above. The resulting solid was dried by hot air at 120° C. for 12 hours to obtain 92.9 g of a solid.

Figure 9:
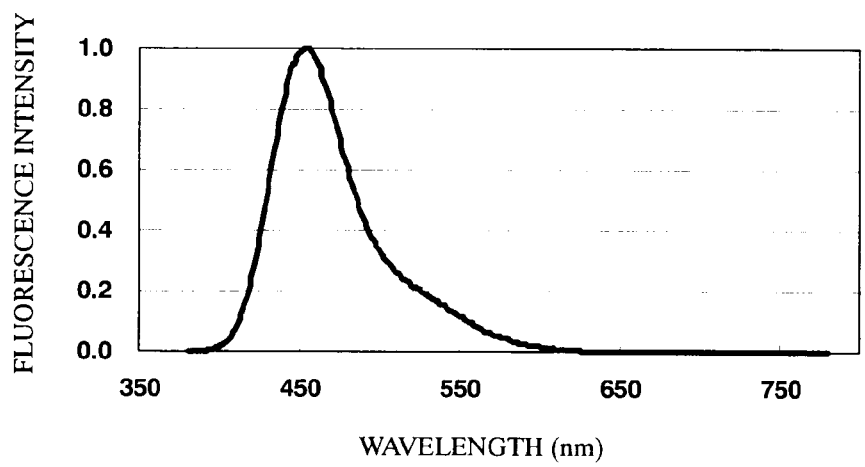
FIG. 9 shows a result of measurement of a fluorescence spectrum of a phosphor of Example 8.

Twenty grams of the resulting solid, 3.0 g of sodium chloride, 3.0 g of potassium chloride, and 6 g of sulfur were stir mixed in a mortar, and the mixture was charged into a crucible. A firing furnace was substituted with nitrogen, and the temperature in the firing furnace was heated by 200° C. per hour until it reached 700° C. Then, the temperature was kept for 6 hours and then cooled off to a room temperature. The resulting solid was rinsed with 100 g of an aqueous solution of 5% acetic acid, rinsed three times with 200 g of ion exchange water, and then vacuum dried at 120° C. to obtain 19.31 g of a dried product. A fluorescence spectrum was measured by UV radiation as in Example 3. The result is shown in FIG. 9.

Further, ESCA analysis was carried out as in Example 3. The results are shown in Table 4, and a quantum efficiency is shown in Table 5. Further, samples for ICP optical emission analysis were prepared, and ICP analysis was performed. The result of Method 1 was 482 ppm. The result of Method 2 was 489 ppm.

TABLE 3

| | Concentration of Ir in phosphor (unit: ppm) | |
|---|---|---|
| | METHOD 1 | METHOD 2 |
| EXAMPLE 3 | 496 | 492 |
| EXAMPLE 4 | 488 | 491 |
| EXAMPLE 5 | 492 | 489 |
| EXAMPLE 6 | 478 | 483 |
| EXAMPLE 7 | 637 | 618 |
| COMPARATIVE EXAMPLE 3 | 488 | 212 |
| COMPARATIVE EXAMPLE 4 | 491 | 234 |
| COMPARATIVE EXAMPLE 5 | 477 | 154 |

TABLE 4

| | ETCHING (0 MIN) | ETCHING (5 MIN) | ETCHING (10 MIN) |
|---|---|---|---|
| EXAMPLE 3 | 499 | 492 | 486 |
| EXAMPLE 4 | 491 | 488 | 487 |
| EXAMPLE 5 | 492 | 489 | 486 |
| EXAMPLE 6 | 475 | 477 | 476 |
| EXAMPLE 7 | 637 | 633 | 631 |
| EXAMPLE 8 | 489 | 488 | 482 |
| EXAMPLE 9 | 477 | 471 | 475 |
| EXAMPLE 10 | 483 | 480 | 479 |
| EXAMPLE 11 | 493 | 499 | 490 |
| EXAMPLE 12 | 478 | 477 | 474 |
| COMPARATIVE EXAMPLE 3 | 453 | 412 | 322 |
| COMPARATIVE EXAMPLE 4 | 396 | 488 | 199 |
| COMPARATIVE EXAMPLE 5 | 479 | 418 | 227 |

TABLE 5

| | QUANTUM EFFICIENCY |
|---|---|
| EXAMPLE 4 | 36.3 |
| EXAMPLE 7 | 36.6 |
| EXAMPLE 8 | 36.9 |
| COMPARATIVE EXAMPLE 4 | 22.2 |

Examples 9-12

The procedure of Example 3 was repeated, except that an iridium complex salt specified in Table 6 was used in an amount specified in Table 6. The results are shown in Table 6.

TABLE 6

| | | AMOUNT USED (g) | ETCHING (0 MIN) | ETCHING (5 MIN) | ETCHING (10 MIN) | METHOD 1 (ppm) | METHOD 2 (ppm) |
|---|---|---|---|---|---|---|---|
| EXAMPLE 9 | AMMONIUM HEXABROMO-IRIDATE(IV) | 0.036 | 477 | 471 | 475 | 477 | 482 |

TABLE 6-continued

| | | AMOUNT USED (g) | ETCHING (0 MIN) | ETCHING (5 MIN) | ETCHING (10 MIN) | METHOD 1 (ppm) | METHOD 2 (ppm) |
|---|---|---|---|---|---|---|---|
| EXAMPLE 10 | SODIUM HEXACHLORO-IRIDATE(III) | 0.024 | 483 | 480 | 479 | 481 | 483 |
| EXAMPLE 11 | POTASSIUM HEXACHLORO-IRIDATE(III) | 0.025 | 493 | 499 | 490 | 491 | 482 |
| EXAMPLE 12 | POTASSIUM HEXABROMO-IRIDATE(III) | 0.039 | 478 | 477 | 474 | 476 | 472 |

Example 13

Figure 10:
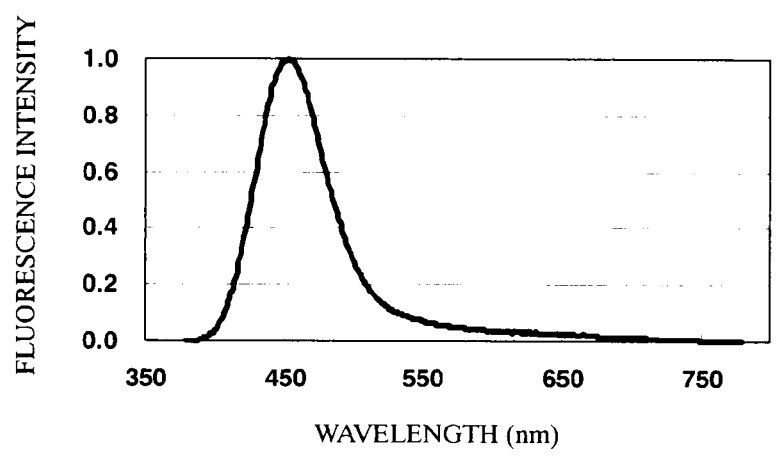
FIG. 10 shows a result of measurement of a fluorescence spectrum of a phosphor of Example 13.

The procedure of Example 1 was repeated, except that 0.28 g of iridium tetrachloride was used in place of 0.25 g of iridium trichloride, to obtain a phosphor. Iridium in the phosphor was analyzed as in Example 1. The results are shown in Table 7, and a quantum efficiency and a concentration of iridium in the phosphor are also shown in Table 7. A fluorescence spectrum is shown in FIG. 10.

TABLE 7

| | ETCHING (0 MIN) | ETCHING (5 MIN) | ETCHING (10 MIN) | QUANTUM EFFICIENCY (%) | METHOD 1 (ppm) | METHOD 2 (ppm) |
|---|---|---|---|---|---|---|
| EXAMPLE 13 | 2836 | 2831 | 2809 | 30.9 | 2851 | 2828 |

Reference Example

Three grams of a mixture that was obtained as in Example 1 was mixed with 30 g of a penthrite explosive, and the mixture was kneaded and thereafter formed into a cylinder. A copper detonator was placed at a center of the molded article, and then the molded article was put into a polyethylene bag. The mixture having the detonator was placed into a 50-L pressure-resistant container having an inner part coated with a copper foil, and the container was sealed. Then, a pressure in the container was reduced to 1 Torr, and nitrogen gas was introduced. This was repeated three times to substitute the inside of the system with nitrogen. Then, the pressure in the system was further reduced to 1 Torr, and then the reaction system was sealed.

The pressure-resistant container was placed into a dome for blasting experiment, and blasting was carried out. After the blasting was finished, nitrogen was introduced into the system. Then, a lid was removed to introduce 1 L of water into the system, and the blast product was rinsed and then removed. Carbide and zinc sulfide were removed from the rinsed product by a centrifuge to obtain 0.6 g of a target blast product.

ICP analysis was carried out on the obtained product. The results of Method 1 are 291 ppm, 787 ppm, and 119 ppm. The results of Method 2 are 199 ppm, 512 ppm, and 66 ppm. Although it was confirmed that the iridium compound was incorporated, uniformity in dispersion between particles was not observed.

INDUSTRIAL APPLICABILITY

The present invention provides a phosphor containing iridium uniformly dispersed in a surface of the phosphor and in an inside of the phosphor. The present invention also provides a method for producing the phosphor. The phosphor of the present invention is excellent in conversion efficiency because it comprises iridium uniformly dispersed in the surface of the phosphor and in an inside of the phosphor. The phosphor of the present invention is suitable for use in light sources, displays, and the like.

The invention claimed is:

1. A phosphor comprising a II-VI compound semiconductor that is doped with iridium,
   wherein the II-VI compound semiconductor comprises a compound of an element of group II and an element of group VI,
   wherein iridium is uniformly dispersed on a surface of the phosphor and within the phosphor, and
   wherein a ratio of the amount of the iridium contained within the phosphor to the amount of the iridium contained on the surface of the phosphor varies within plus or minus 5%.

2. The phosphor of claim 1, wherein the II-VI compound semiconductor has a hexagonal or cubic crystal structure.

3. The phosphor of claim 1, wherein the II-VI compound semiconductor has a polymorphic crystal mixture.

4. The phosphor of claim 1, wherein the II-VI compound semiconductor comprises at least one of zinc sulfide, cadmium sulfide, zinc selenide, and cadmium selenide.

5. The phosphor of claim 1, which contains 5-10,000 ppm of the iridium.

6. The phosphor of claim 1, which contains 10-8,000 ppm of the iridium.

7. The phosphor of claim 1, wherein the element of group II is calcium, magnesium, barium, strontium, zinc or cadmium.

8. The phosphor of claim 1, wherein the element of group II is zinc or cadmium.

9. The phosphor of claim 1, wherein the element of group VI is sulfur.

10. The phosphor of claim 1, wherein the element of group VI is selenium.

11. A method for producing the phosphor of claim 1, comprising:
   providing an inorganic composition comprising a mixture of a II-VI compound semiconductor and an iridium compound; and firing the inorganic composition at constant firing temperature that falls within the range of between 500° C. and 1250° C., wherein the inorganic composition is heated to increase a temperature of the inorganic composition at a rate of 2.0° C./min to 40.0° C./min until said constant firing temperature is achieved, wherein the iridium compound is an iridium complex salt.

12. The method of claim 11, wherein the inorganic composition is obtained by mixing an aqueous solution containing a group II metal salt with an aqueous solution containing a group VI compound; and the iridium complex salt is present in at least one of the aqueous solution containing the group II metal salt and the aqueous solution containing the group VI compound.

13. A method for producing the phosphor of claim 1, comprising:

mixing in an aqueous medium a group II metal salt, a group VI compound, and an iridium complex salt and then removing water from the resulting mixture to obtain an inorganic composition; and firing the inorganic composition at a constant firing temperature that falls within the range between 500° C. and 1250° C., wherein the inorganic composition is heated to increase a temperature of the inorganic composition at a rate of 2.0° C./min to 40.0° C./min until said constant firing temperature is achieved.

14. The method of claim 12, wherein the iridium complex salt is a hexachloroiridium salt.

15. The method of claim 13, wherein the iridium complex salt is a hexachloroiridium salt.

16. The method of claim 11, wherein the II-VI compound semiconductor comprises at least one of zinc sulfide, cadmium sulfide, zinc selenide, and cadmium selenide.

17. The method of claim 11, wherein the II-VI compound semiconductor has a hexagonal or cubic crystal structure.

18. The method of claim 11, wherein the II-VI compound semiconductor has a polymorphic crystal mixture.

* * * * *